(No Model.)
F. T. TARBOX.
DUMPING WAGON.
No. 313,126. Patented Mar. 3, 1885.
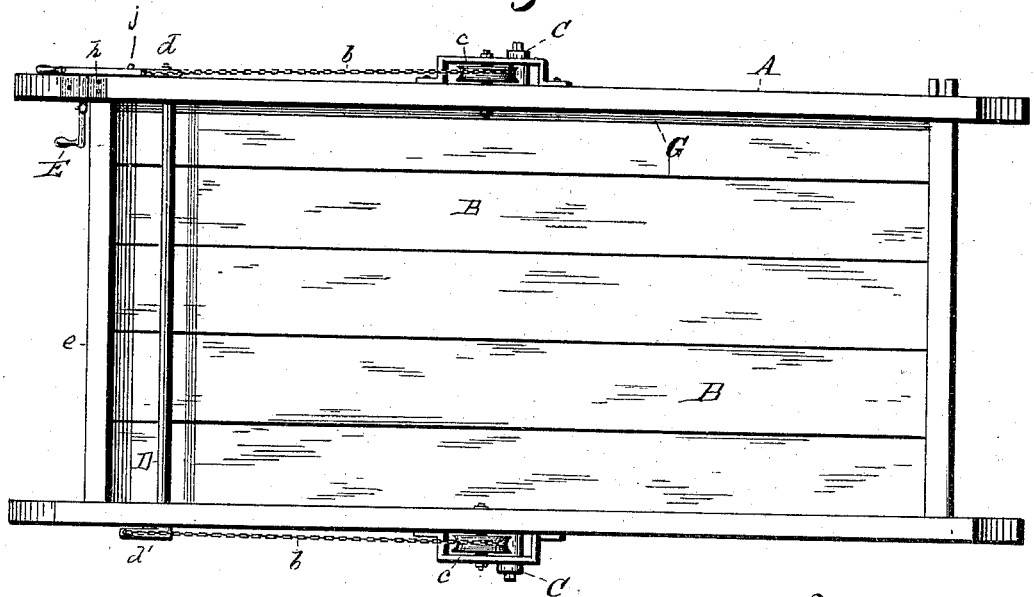
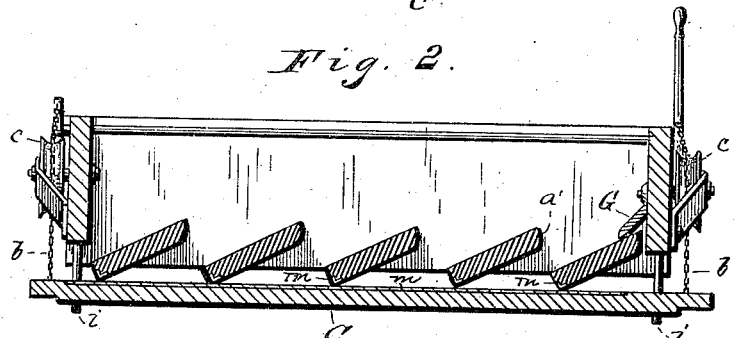
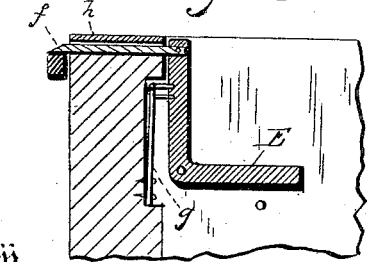 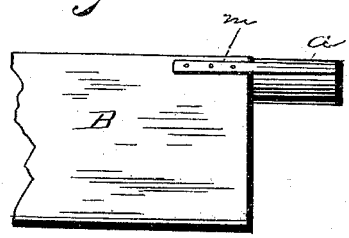
Witnesses
W. Engel
H. A. Wise
Inventor
Frank T. Tarbox
By Thos. B. Hall
Attorney

UNITED STATES PATENT OFFICE.

FRANK T. TARBOX, OF CEDARVILLE, OHIO.

DUMPING-WAGON.

SPECIFICATION forming part of Letters Patent No. 313,126, dated March 3, 1885.

Application filed May 20, 1884. (No model.)

*To all whom it may concern:*

Be it known that I, FRANK T. TARBOX, a citizen of the United States, residing at Cedarville, county of Greene, and State of Ohio, have invented certain new and useful Improvements in Dumping-Wagons; and I do hereby declare the following to be a description of the same and of the manner of constructing and using the invention in such full, clear, concise, and exact terms as to enable any person skilled in the art to which it appertains to construct and use the same, reference being had to the accompanying drawings, forming a part of the specification, the principle of the invention being herein explained and the best mode in which I have contemplated applying that principle, so as to distinguish it from other inventions.

In the drawings, Figure 1 is a plan view. Fig. 2 is a vertical cross-section taken through the supporting cross-bar, and showing the parts in dumping position. Fig. 3 is a detail in vertical section of the locking mechanism. Fig. 4 is a detail bottom plan view of one extremity of a slot.

A is the wagon-box. B are the bottom slats, provided with journals $a$, loosely turning in bearings $a'$ formed in the end-boards of the box. C is an under cross-bar, which maintains the slats in their horizontal face position, and also in their oblique edgewise position, as desired. Said cross-bar is linked at its respective ends to chains $b$, by which it is operated in restoring said slats from their oblique to their horizontal face position. Said chains are linked at their upper ends to arms $d$ $d'$ of rock-shaft D, located on the respective sides of the wagon-box, said arms being rigid on said shaft, said shaft extending through both side-boards of the box. Said chains operate over pulleys $c$, located on the exterior of the respective side-boards of the box. Arm $d$ of shaft D extends sufficiently toward the forward end of the box to be under the control of the driver. The driver, by means of said arm, in connection with associated mechanism, controls the position of the said slats.

On the front side of the forward end-board, $e$, of the box is located the pedal-lever E, pivoted to said board. Said lever has pivoted to it at the upper extremity of its upright arm the horizontal latch $f$, adapted to catch in with the arm $d$ of shaft D, thereby holding the dumping mechanism in a locked position. The normal function of said latch is controlled by the small spring $g$, linked by a loop to the upright arm of said pedal-lever, and riveted onto the side-board of the box in vertical line with said arm. The metallic cap $h$ provides a guard and guideway for said latch.

From the two side-boards, respectively, of the box depend the two hangers $i$, which arrest the descent of cross-bar C at such a point as adapts said bar to maintain the slats in their oblique position. The upper side of said bar is faced with metal, $m$, to diminish friction as the slats are raised by it. The slats are severally similarly faced with metal, $m$, on their edges, where they impinge against said cross-bar, for the same purpose of diminishing friction. For the same purpose, also, the respective journals $a$ of said slats are faced with metal, $m$, and also the bearings $a'$, in which said journals work, are bushed with metal, $m$, and for the same purpose. By reason of said metallic facing on said bar, slats, journals, and in said bearings, the slats turn automatically to their oblique position under the pressure of the load when the aforesaid mechanism is unlocked, said result being concurrently produced by the location of said journals in the extreme edge line of said slats, respectively. Box A is provided on one of its sides with the dirt-guard G, adapted to prevent the dirt or gravel from clogging the slat that is hinged nearest to it on the return of said slat to its horizontal face position. On the exterior of the right-hand side board of the box is the small loop $j$, to hold arm $d$.

Dumping-wagons have heretofore been made with bottom slats pivoted at their ends in the wagon-box; but such slats being not pivoted, respectively, in the longitudinal line of one of their edges, as mine are in my invention, such wagons are not self-dumpers in the way that mine is, but need the extraneous starting push of some associated appliance. In my invention the slats are so pivoted that they demand no other agency to start them in their tipping than what is furnished by the load itself when the sustaining cross-bar is lowered. Other machines also lack the metallic facings of the pivots and of the cross-bar, and of the sockets that mine shows. Other machines also lack the dirt-guard and the pedal-lever, with its associated mechanism, as these special features of my machine are herein set forth and shown.

I therefore claim—

1. In a dumping-wagon, the combination of bottom slats, B, respectively provided with end journals, $a$, located in the longitudinal line of one of their edges, as described, said journals faced on their bearings with metal, the metal-lined sockets $a'$, the cross-bar C, faced with metal on its upper side, the metal plates $m$, located on such portions of said bottom slats as impinge on said cross-bar, and mechanism to lock and unlock said bar, substantially as set forth.

2. In a dumping-wagon, the combination, with the series of bottom slats, B, adapted to tilt automatically on their journaled ends, and provided with locking and unlocking mechanism, as described, of the dirt-guard G, located longitudinally on one of the sides of the wagon-box and over the hinge edge of one of said series of slats, substantially as set forth.

In testimony that I claim the foregoing to be my invention I have hereunto set my hand this 1st day of May, A. D. 1884.

FRANK T. TARBOX.

Witnesses:
CHAS. H. KEYLE,
M. DeMOTTE.